(12) United States Patent
Park et al.

(10) Patent No.: US 10,936,261 B2
(45) Date of Patent: Mar. 2, 2021

(54) PRINTING METHOD AND SYSTEM USING CLOUD

(71) Applicant: HEWLETT-PACKARD DEVELOPMENT COMPANY, L.P., Spring, TX (US)

(72) Inventors: In Cheon Park, Pangyo (KR); Gi Won Seo, Pangyo (KR); Young Hoon Son, Pangyo (KR); Jong Ha Yun, Pangyo (KR); Byeong Jin Lee, Pangyo (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/609,242

(22) PCT Filed: Jul. 2, 2018

(86) PCT No.: PCT/KR2018/007466
§ 371 (c)(1),
(2) Date: Oct. 29, 2019

(87) PCT Pub. No.: WO2019/013481
PCT Pub. Date: Jan. 17, 2019

(65) Prior Publication Data
US 2020/0073606 A1  Mar. 5, 2020

(30) Foreign Application Priority Data

Jul. 14, 2017 (KR) .................. 10-2017-0089671

(51) Int. Cl.
*G06F 3/12* (2006.01)
*H04L 29/06* (2006.01)
*H04N 1/44* (2006.01)

(52) U.S. Cl.
CPC .......... *G06F 3/1238* (2013.01); *G06F 3/1222* (2013.01); *G06F 3/1231* (2013.01);
(Continued)

(58) Field of Classification Search
None
See application file for complete search history.

(56) References Cited

U.S. PATENT DOCUMENTS 9,152,366 B2   10/2015  Gutnik
2009/0262388 A1   10/2009  Park
(Continued)

FOREIGN PATENT DOCUMENTS

EP         2960779 A1   12/2015
WO    WO-2013085281    6/2013
WO    WO-2016171473   10/2016

*Primary Examiner* — Lennin R RodriguezGonzalez
(74) *Attorney, Agent, or Firm* — Trop Pruner & Hu, P.C.

(57) ABSTRACT

A printing method and a printing system are provided. A printing system comprises a user terminal, a cloud, and at least one authentication server to perform user authentication of at least one image forming apparatus with respect to a user of the user terminal, wherein the cloud receives a registration request for the user with respect to a first image forming apparatus from the user terminal and transmits the registration request for the user including identification (ID) information of the first image forming apparatus and ID information of the user to a first authentication server corresponding to the first image forming apparatus, and receives an authentication request for the user with respect to the first image forming apparatus from the user terminal and transmits the authentication request for the user including the ID information of the first image forming apparatus and the ID information of the user to the first authentication server, and wherein the first authentication server performs authentication in response to the authentication request for the user and transmits a result of the authentication to the first image forming apparatus.

19 Claims, 11 Drawing Sheets

(52) U.S. Cl.
CPC ............ *G06F 3/1288* (2013.01); *H04L 63/02* (2013.01); *H04L 63/0807* (2013.01); *H04N 1/4433* (2013.01)

(56) References Cited

U.S. PATENT DOCUMENTS

2016/0112585 A1    4/2016  Park et al.
2017/0013169 A1    1/2017  Kim et al.

[Fig. 1]
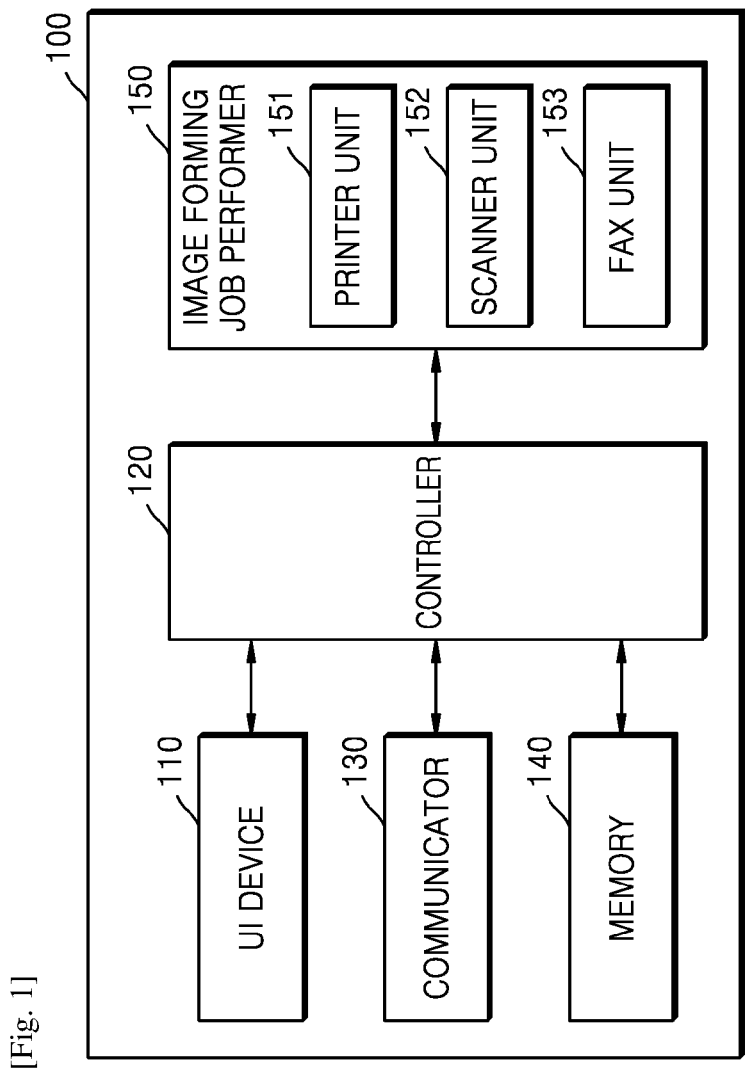

[Fig. 2]
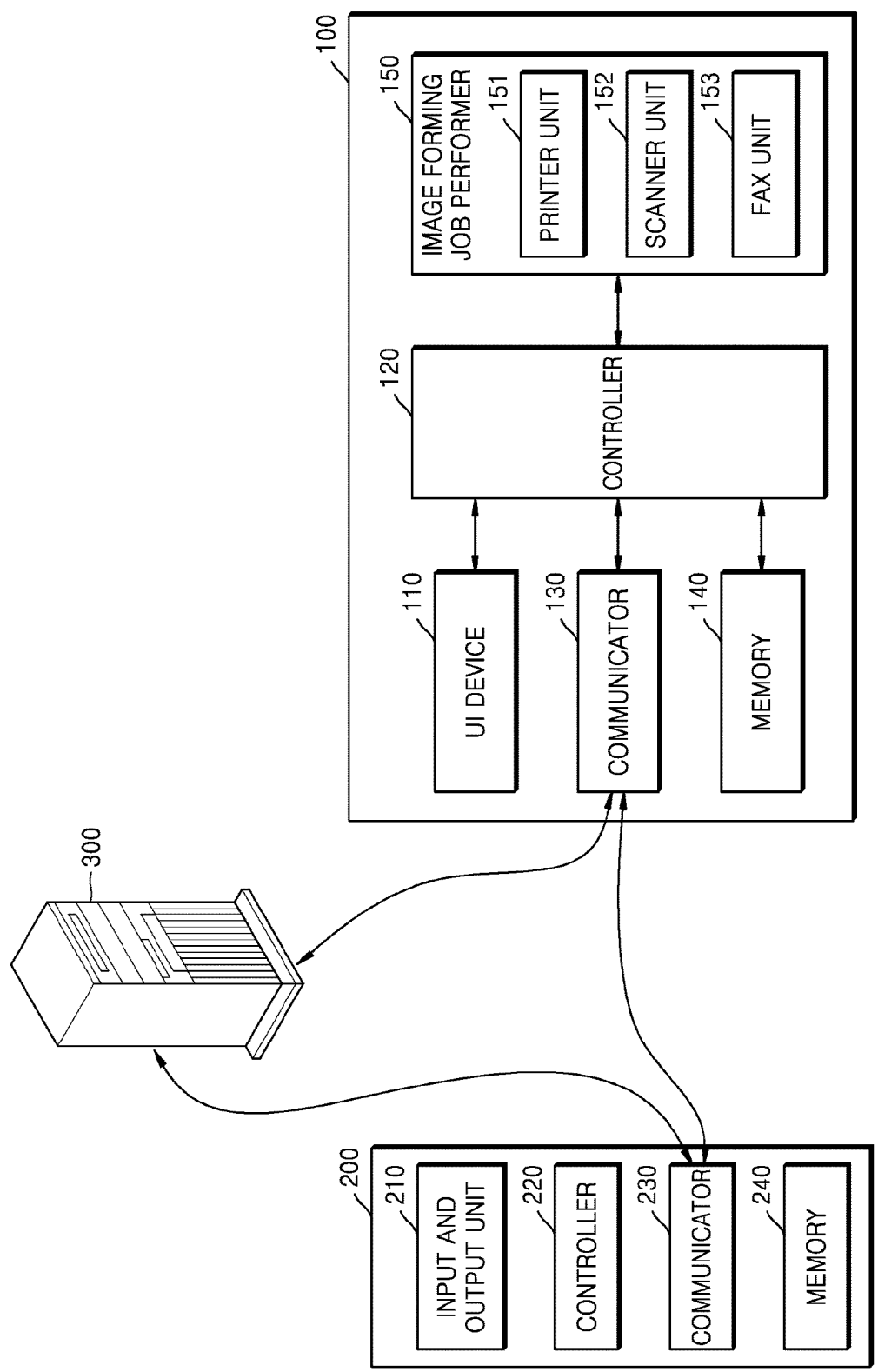

[Fig. 3]
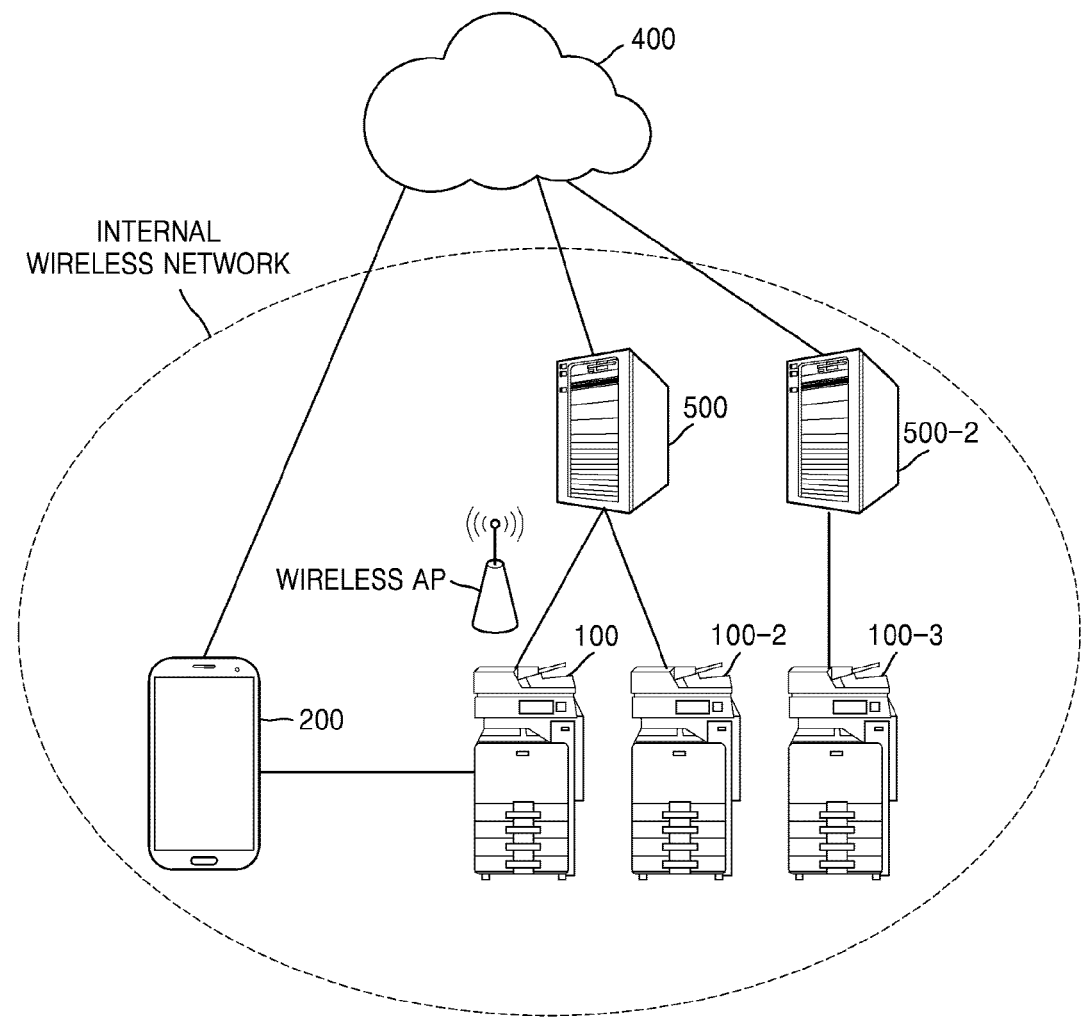

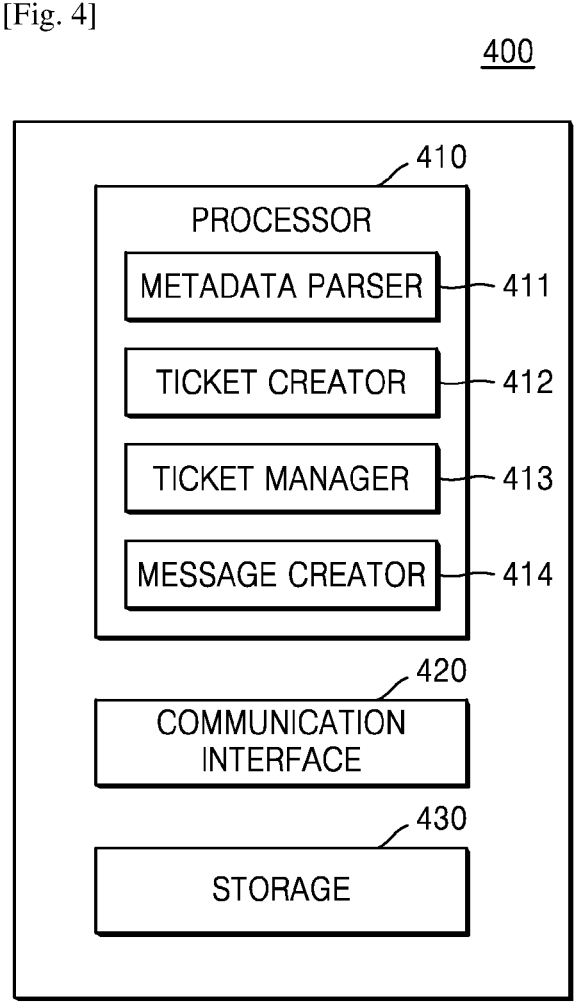
[Fig. 4]

[Fig. 5]
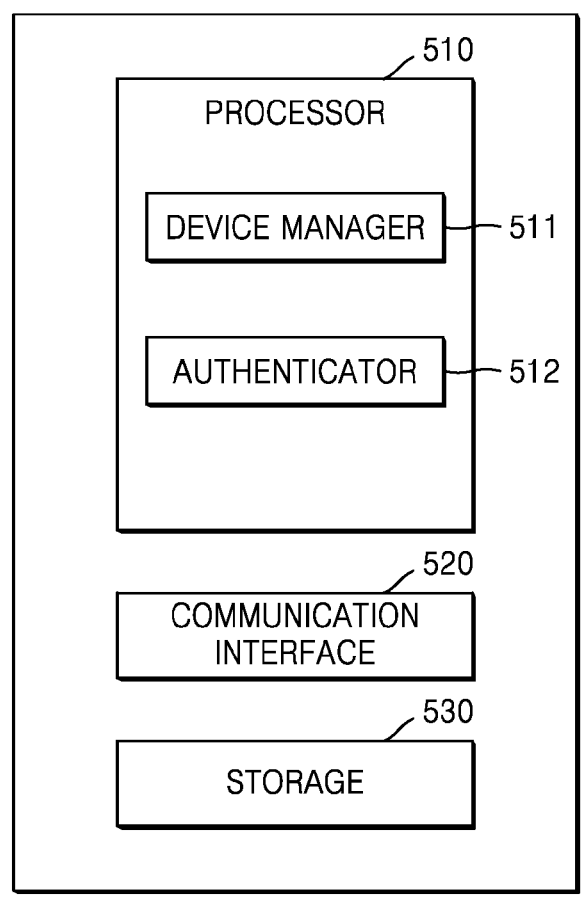

[Fig. 6]
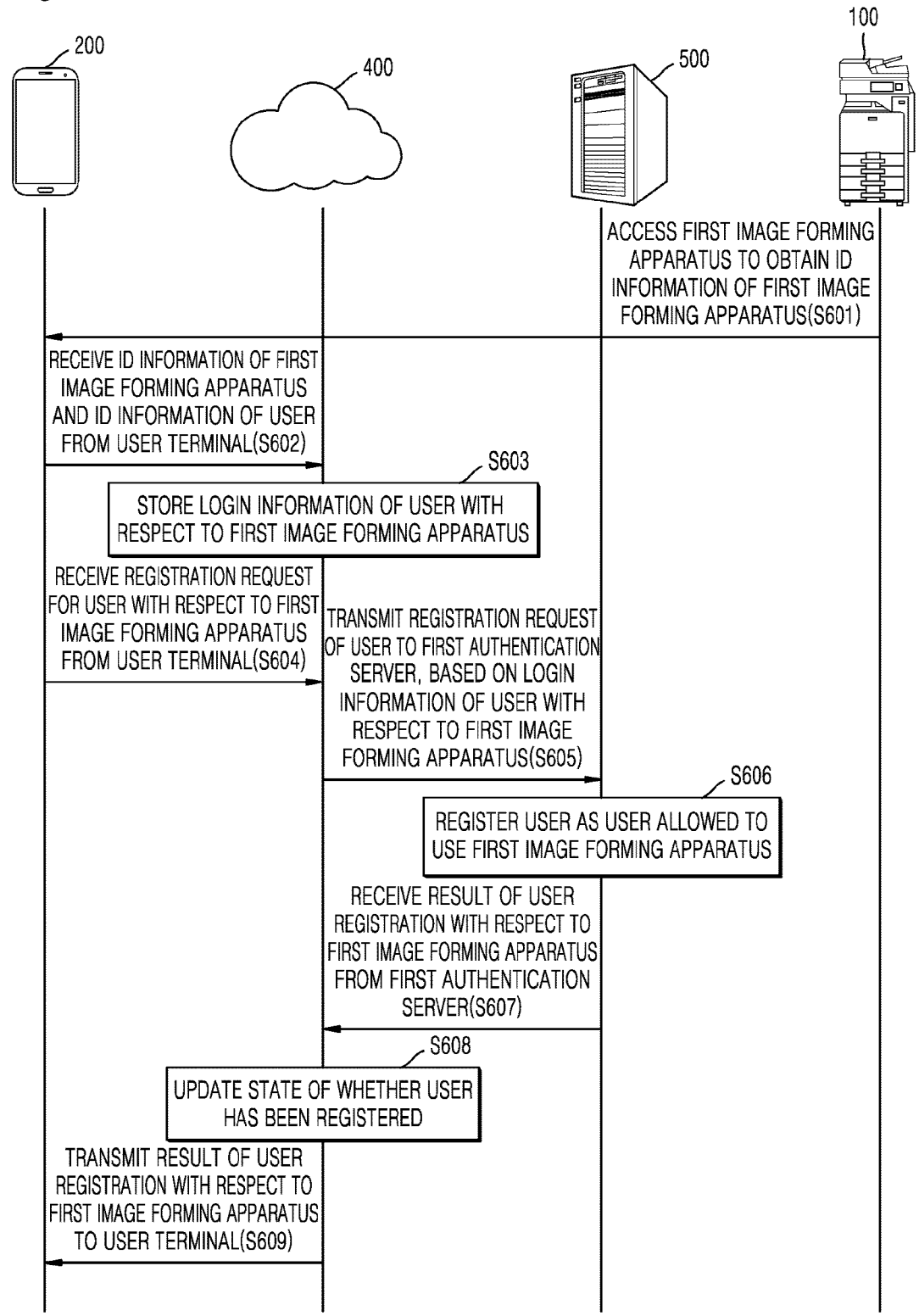

[Fig. 7]
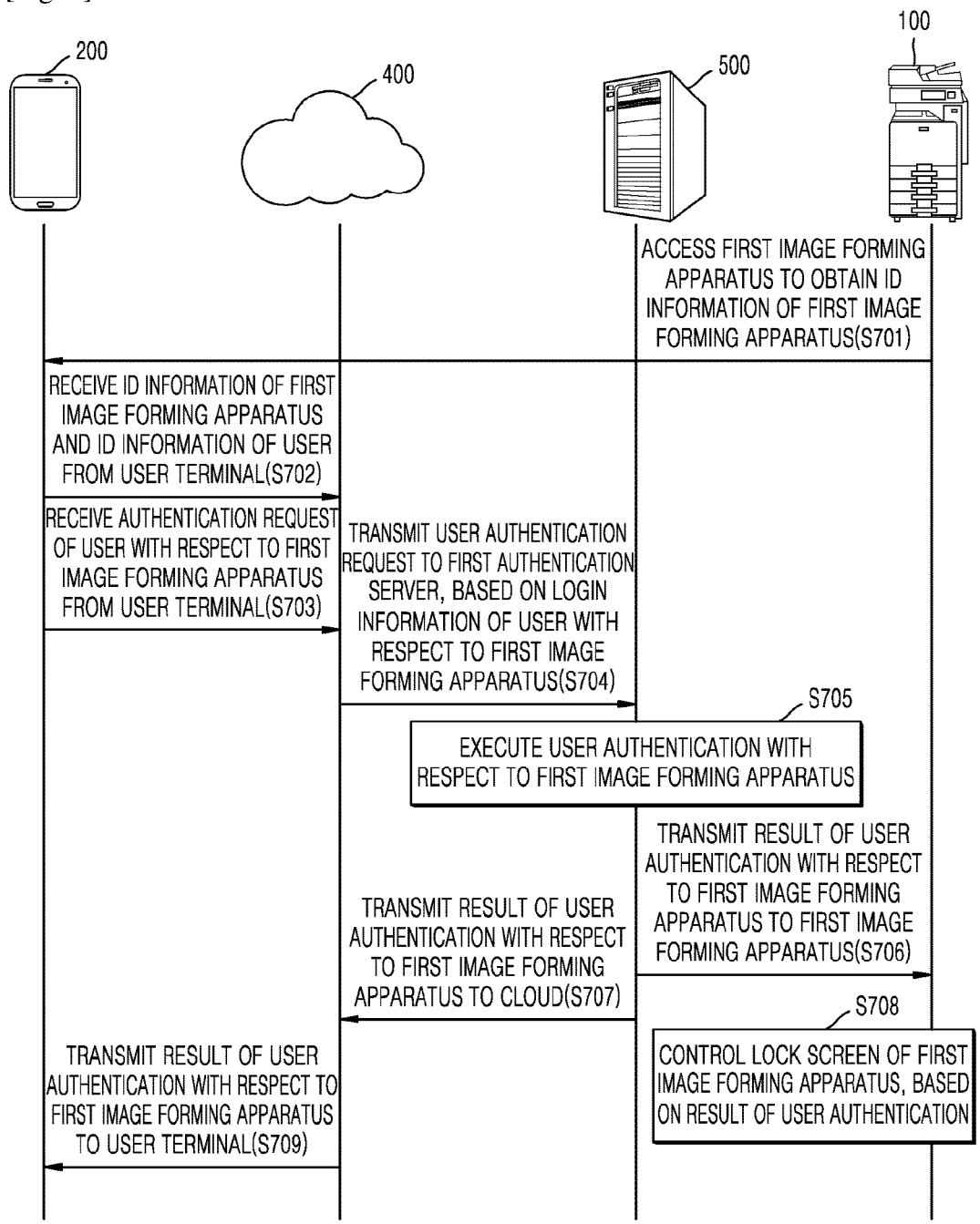

[Fig. 8]
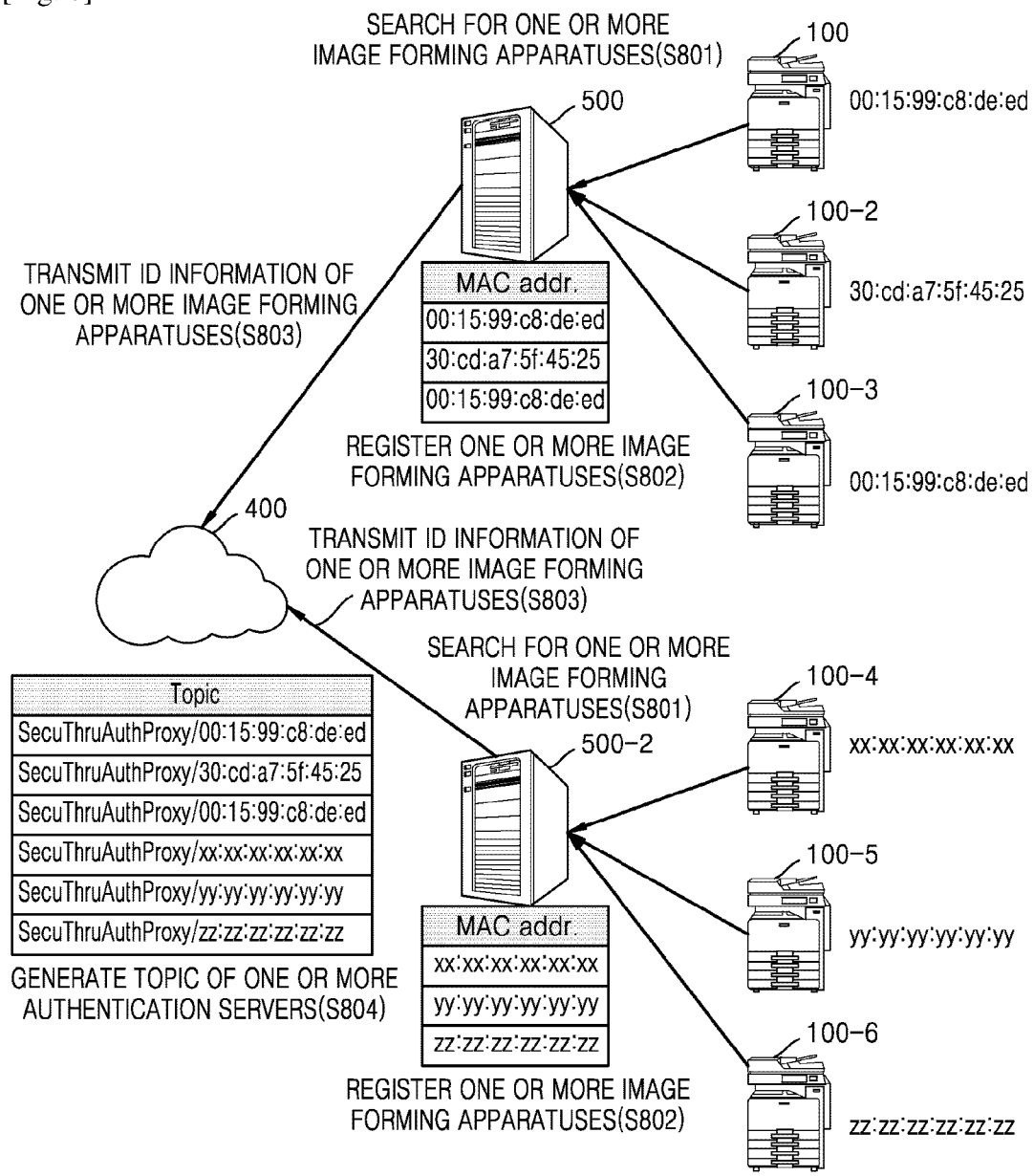

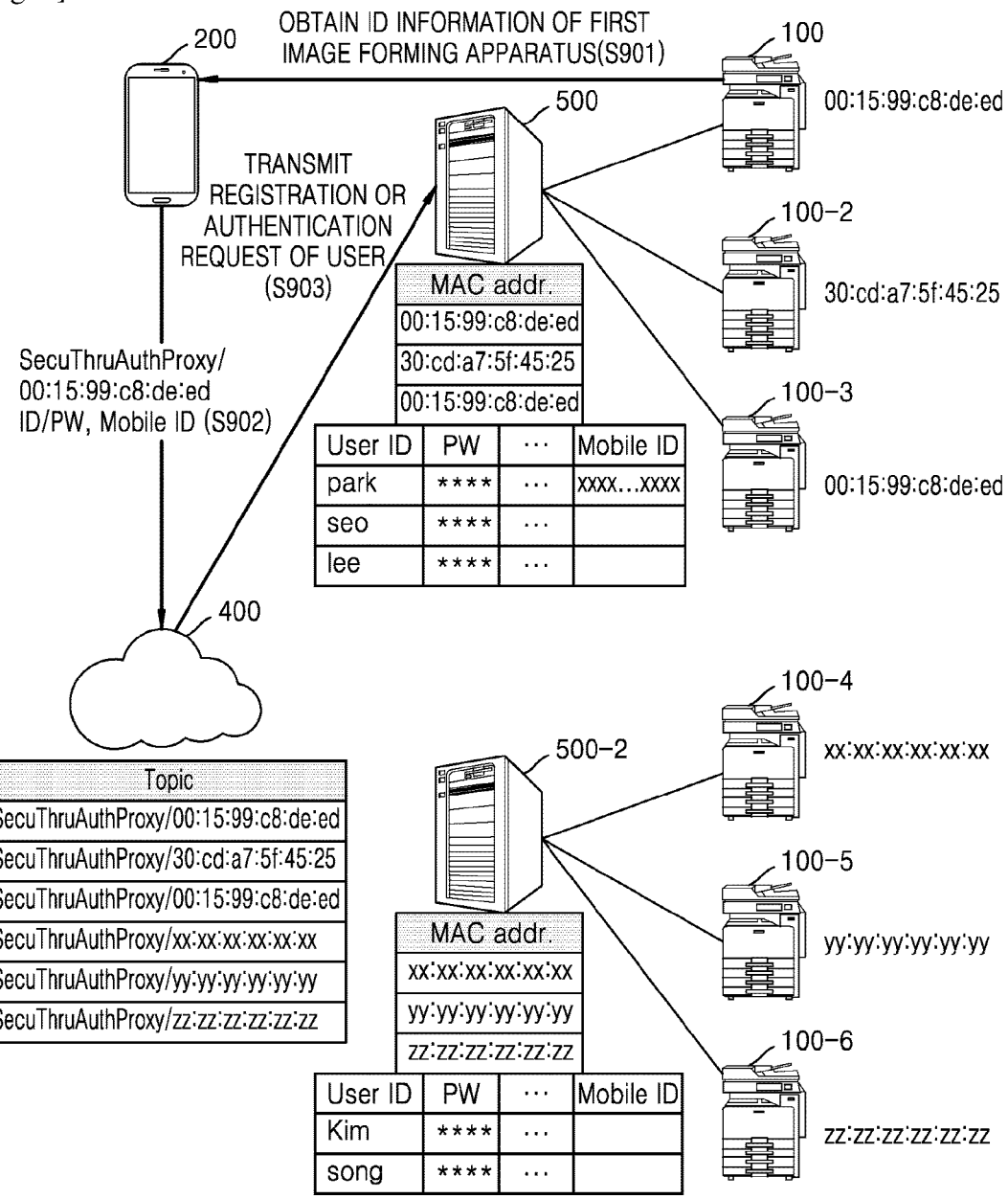

[Fig. 10]
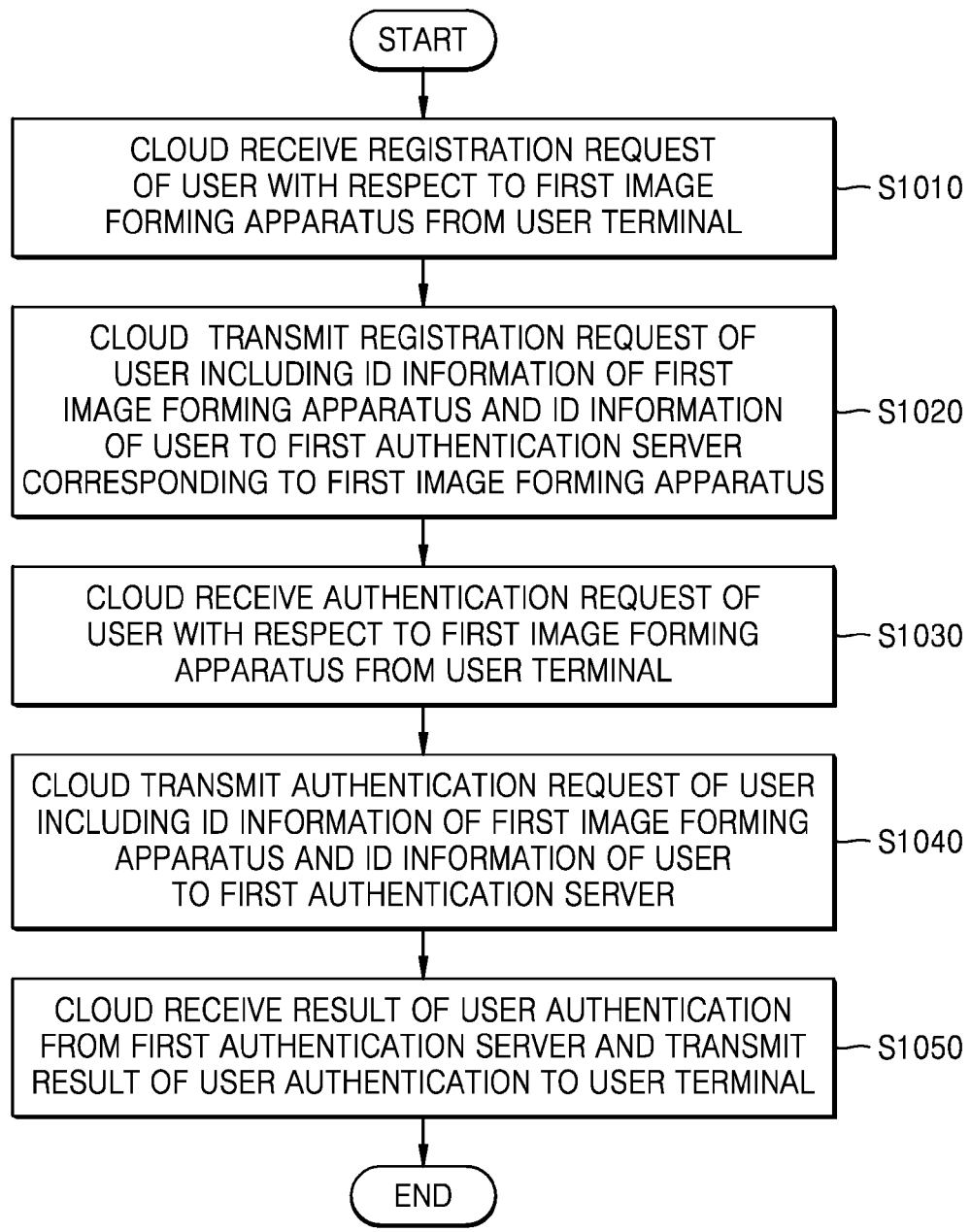

[Fig. 11]
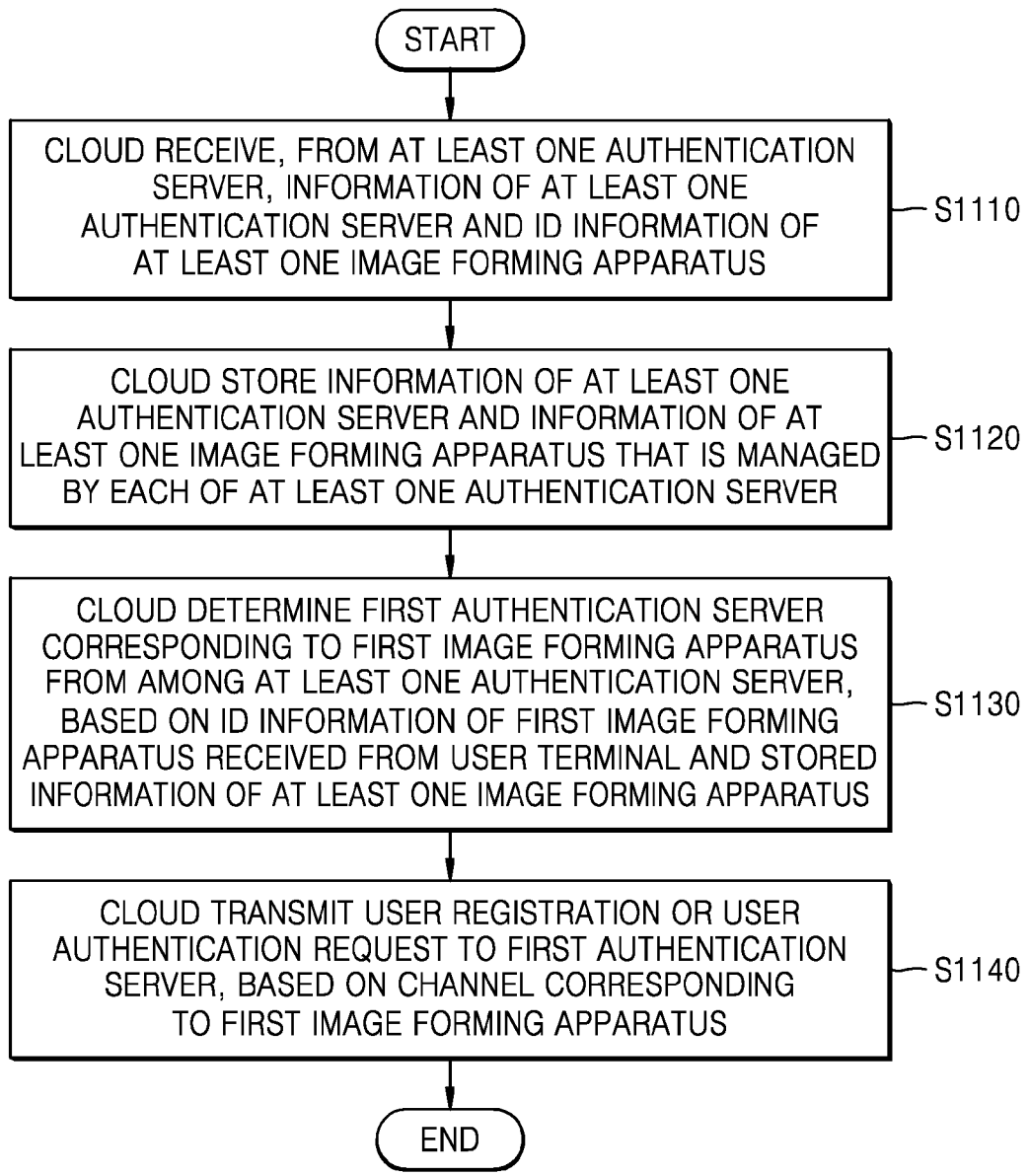

PRINTING METHOD AND SYSTEM USING CLOUD

BACKGROUND ART

The disclosure relates to a printing method and system using a cloud.

As a replacement period of computer hardware and software is shortened due to the fast development thereof, the use of cloud computing technology to reduce the necessity of replacing hardware and software by enabling users to share many resources by virtualizing a computer environment has attracted much attention from users.

Cloud computing is a type of computing having a paradigm of "information being permanently stored in a server on the Internet and temporarily stored in a client, such as a desktop, a table computer, a laptop computer, a wall-mountable computer, or a portable apparatus." Thus, in general cloud computing, software and data are stored in a server.

With developments in such cloud computing, a cloud printing system seeking to share and use printer resources has been developed.

In a printing system environment, a printing method and system using a cloud is required due to the risk of exposure of personal information of a user.

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a block diagram of an image forming apparatus according to an example;

FIG. 2 is a diagram showing an environment in which an image forming apparatus is connected to a user terminal or a server according to an example;

FIG. 3 is a diagram for explaining a printing system and a printing environment that use a cloud according to an example;

FIG. 4 is a block diagram of a cloud according to an example;

FIG. 5 is a block diagram of an authentication server according to an example;

FIG. 6 is a diagram for explaining a process in which a cloud requests an authentication server to register a user who desires to use an image forming apparatus and the authentication server registers the user according to an example;

FIG. 7 is a diagram for explaining a process in which a cloud requests an authentication server to authenticate a user who desires to use an image forming apparatus and the authentication server authenticates the user according to an example;

FIG. 8 is a diagram for explaining a process in which an authentication server registers an image forming apparatus and a cloud generates a topic of the authentication server by using identification (ID) information of the image forming apparatus according to an example;

FIG. 9 is a diagram for explaining a user registration or user authentication process of an image forming apparatus by using a cloud when a plurality of authentication servers exist in a printing system according to an example;

FIG. 10 is a flowchart of a printing method using a cloud according to an example; and FIG. 11 is a flowchart of a printing method using a cloud in which, when a plurality of authentication servers exist, a cloud requests an authentication server corresponding to an image forming apparatus to register or authenticate a user with respect to the image forming apparatus according to an example.

Throughout the drawings, like reference numerals will be understood to refer to like parts, components, and structures.

MODE FOR THE INVENTION

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. Also, the term "unit" in the examples of the present disclosure means a software component, or a hardware component (such as, a field-programmable gate array (FPGA) or an application-specific integrated circuit (ASIC)), and performs a specific function. However, the term "unit" is not limited to software or hardware. The term "unit" may be configured to be included in an addressable storage medium or to reproduce one or more processors. Thus, for example, the term "unit" may refer to components such as software components, object-oriented software components, class components, and task components, and may include processes, functions, attributes, procedures, sub-routines, segments of program code, drivers, firmware, micro codes, circuits, data, a database, data structures, tables, arrays, or variables. A function provided by the components and "units" may be associated with the smaller number of components and "units," or may be divided into additional components and "units."

While such terms as "first," "second," etc., may be used to describe various components, such components must not be limited to the above terms. The above terms are used only to distinguish one component from another. For example, a first component discussed below could be termed a second component, and similarly, a second component may be termed a first component without departing from the teachings of this disclosure. The term "and/or" includes any and all combinations of one or more of the associated listed items.

In the specification, an "image forming job" may denote any one of various jobs (e.g., printing, scanning, copying, or faxing) related to an image, such as forming of an image or generating/storing/transmitting of an image file, and a "job" may denote not only an image forming job, but may also denote a series of processes required to perform the image forming job.

An "image forming apparatus" may denote any apparatus capable of performing an image forming job, such as a printer, a scanner, a copier, a fax machine, a multi-function printer (MFP), or a display apparatus.

A "hard copy" may denote an operation of printing an image on a print medium, such as a paper, and a "soft copy" may denote an operation of printing an image on a display device, such as a television (TV) or a monitor, or saving an image to a memory.

"Content" may denote any type of data that is a target of an image forming job, such as a picture, an image, a document file, or the like.

"Print data" may denote data having a format printable by a printer.

A "scan file" may denote a file generated by scanning an image by using a scanner.

A "user" may denote a person who performs manipulation related to an image forming job by using an image forming apparatus or a device connected to the image forming apparatus wirelessly or via wires. A "manager" may denote a person who has authority to access all functions and a system of an image forming apparatus. A "manager" and a "user" may be the same person.

The below examples relate to a printing method and a printing system in which an authentication server within an internal wireless network performs user registration and user authentication by using a user terminal and a cloud, and a detailed description of matters well known to one of ordinary skill in the art to which the below examples pertain will be omitted.

Examples of the disclosure are described herein with reference to the accompanying drawings so that the disclosure may be easily performed by one of ordinary skill in the art to which the disclosure pertains. The disclosure may, however, be embodied in many different forms and should not be construed as being limited to the examples set forth herein.

FIG. 1 is a block diagram of an image forming apparatus according to an example.

Referring to FIG. 1, an image forming apparatus 100 may include a user interface (UI) device 110, a controller 120, a communicator 130, a memory 140, and an image forming job performer 150. Although not shown in FIG. 1, the image forming apparatus 100 may further include a power supplier for supplying power to each component of the image forming apparatus 100.

The UI device 110 may include an input unit for receiving, from a user, an input for performing an image forming job, and an output unit for displaying information, such as a result of performing an image forming job or a state of the image forming apparatus 100. For example, the UI device 110 may include a manipulation panel for receiving a user input, and a display panel for displaying a screen image.

In more detail, the input unit may include at least one of devices capable of receiving various types of user inputs, such as a keyboard, a physical button, a touch screen, a camera, a microphone, or the like. The output unit may include, for example, a display panel, a speaker, or the like. However, examples are not limited thereto, and the UI device 110 may include at least one device that supports various inputs and outputs.

The controller 120 may control overall operations of the image forming apparatus 100, and may include at least one processor, such as a central processing unit (CPU). The controller 120 may control other components included in the image forming apparatus 100 such that an operation corresponding to a user input received via the UI device 110 is performed. The controller 120 may include at least one specialized processor corresponding to each function, or may be an integrated processor.

For example, the controller 120 may execute a program stored in the memory 140, read the data or a file stored in the memory 140, or store a new file in the memory 140.

The communicator 130 may communicate with another device or a network in a wired or wireless manner. To this end, the communicator 130 may include a communication module, such as a transceiver, that supports at least one of various wired and wireless communication methods. For example, the communication module may be in the form of a chipset, or may be a sticker or barcode (e.g., a sticker including a near field communication (NFC) tag) including information necessary for communication.

Wireless communication may include, for example, at least one of wireless fidelity (WiFi), WiFi Direct, Bluetooth, ultra wide band (UWB), and NFC. Wired communication may include at least one of a universal serial bus (USB) and a high definition multimedia interface (HDMI).

The communicator 130 may be connected to an external apparatus outside the image forming apparatus 100 to transmit or receive a signal or data to or from the external apparatus. For example, the image forming apparatus 100 may be connected to a user terminal via the communicator 130. The communicator 130 may transmit a signal or data received from the user terminal to the controller 120, or transmit a signal or data generated by the controller 120 to the user terminal. For example, when the communicator 130 receives a print command signal or print data from the user terminal, the controller 120 may output the received print data through a printer unit 151.

FIG. 2 is a diagram showing an environment in which an image forming apparatus is connected to a user terminal or a server according to an example.

Referring to FIG. 2, a user terminal 200 may include an input and output interface 210, a controller 220, a communicator 230, and a memory 240. The controller 220 may control an image forming job by executing a program stored in the memory 240 and transmitting a signal or data generated as a result of executing the program to the image forming apparatus 100 through the communicator 230. The user terminal 200 may include, for example, a smartphone, a tablet, a personal computer (PC), a home appliance, a camera, or a wearable device.

The communicator 130 may be directly connected to a server 300 to transmit and receive a signal or data to and from the server 300. The communicator 130 may be connected to the user terminal 200 via the server 300. In other words, the communicator 130 of the image forming apparatus 100 may transmit and receive a signal or data to and from the communicator 230 of the user terminal 200 via the server 300.

Referring back to FIG. 1, various types of data, such as a file, and a program, such as an application, may be installed and stored in the memory 140. The controller 120 may access and use data stored in the memory 140 or may store new data in the memory 140. The controller 120 may execute the program installed in the memory 140. The controller 120 may install, in the memory 140, an application received from an external source through the communicator 130.

The image forming job performer 150 may perform an image forming job, such as printing, scanning, copying, or faxing.

The image forming job performer 150 includes the printer unit 151, a scanner unit 152, and a fax unit 153, but as occasion demands, the image forming job performer 150 may include some of them or may further include a component for performing another type of image forming job.

The printer unit 151 may form an image on a recording medium via any one of various printing methods, such as an electrophotography method, an inkjet method, a thermal transfer method, a thermal method, or the like.

The scanner unit 152 may irradiate light onto paper and receive light reflected from the paper on an image sensor to read an image recorded on the paper. Examples of an image sensor for reading an image from paper include a charge-coupled device (CCD) and a contact type image sensor (CIS). The scanner unit 152 may have a flatbed structure in which paper is located at a fixed location and an image sensor moves to read an image, a document feed structure in which an image sensor is located at a fixed location and paper is transferred, or a combination structure thereof.

The fax unit 153 may share a component for scanning an image with the scanner unit 152, share a component for printing a received file with the printer unit 151, transmit a scan file to a destination, or receive a file from an external source.

The names of the components of the image forming apparatus 100 may change. The image forming apparatus 100 may include at least one of the aforementioned components. Some of the aforementioned components may be omitted, or other components may be further included in addition to the aforementioned components.

The UI device 110 of FIG. 1 may include an independent control system. In other words, the UI device 110 of FIG. 1 may include a control system (a controller and a memory) for controlling a UI provided by the UI device 110, separate from the controller 120 of the image forming apparatus 100. An operating system (OS) for providing a UI, and programs, such as an application for supporting various functions, may be installed in the control system of the UI device 110.

FIG. 3 is a diagram for explaining a printing system and a printing environment that use a cloud according to an example.

Referring to FIG. 3, the printing environment includes image forming apparatuses 100, 100-2, and 100-3, a user terminal 200, a cloud 400, and authentication servers 500 and 500-2. The printing environment may include at least one image forming apparatus 100, at least one user terminal 200, and at least one authentication server 500, and the at least one user terminal 200 and the at least one authentication server 500 may be connected to the cloud 400. The components of the printing environment may perform communication using Hypertext Transfer Protocols (HTTPs).

The image forming apparatus 100 may be set to be used by only an authorized user. When authentication is activated in the image forming apparatus 100, the image forming apparatus 100 may display a lock screen to restrict access of a user. For example, the image forming apparatus 100 may display a lock screen for user authentication on the UI device 110. The user may complete authentication with respect to the image forming apparatus 100 and may use the image forming apparatus 100.

The user terminal 200 may be connected to an authentication server via a wireless access point (AP) to request the authentication server to authenticate the image forming apparatus 100. However, in some cases, the user terminal 200 may not use an internal wireless network that uses the wireless AP, according to a network environment setting or a communication policy. When the user terminal 200 is unable to access the authentication server 500 by using the internal wireless network, the user terminal 200 may be connected to the authentication server 500 via the cloud 400 and request the authentication server 500 to perform authentication. When user authentication is completed in the authentication server 500 within the internal wireless network by using the user terminal 200 and the cloud 400, the image forming apparatus 100 may release the lock screen, and an authorized user may use the image forming apparatus 100 according to a usage authority and allocated usage. Referring to FIG. 3, the cloud 400 may be located outside the internal wireless network. The cloud 400 may be connected to the authentication server 500, outside a firewall of a network between the image forming apparatus 100 and the authentication server 500.

The user terminal 200 may access the image forming apparatus 100 to obtain identification (ID) information, such as a MAC address, of the image forming apparatus 100. For example, after a user installs, in the user terminal 200, an application that supports user authentication of printing by the image forming apparatus 100, executes the installed application, and generates a user input, such as an ID and a password (PW) of the user that are used during the user authentication in the authentication server 500, the user may establish an NFC connection with the image forming apparatus 100, scan a quick response (QR) code on the image forming apparatus 100, or access the image forming apparatus 100 by using Bluetooth low energy (BLE) to thereby obtain ID information of the image forming apparatus 100, such as a MAC address. Alternatively, the user may directly input the ID information of the image forming apparatus 100 to an application executed in the user terminal 200. Once the user terminal 200 obtains the ID information of the image forming apparatus 100, the user terminal 200 may transmit a user registration request or a user authentication request including the ID information of image forming apparatus 100, ID information of the user terminal 200, and user information to the cloud 400 by executing the application that supports user authentication.

The cloud 400 may receive, from the user terminal 200, a user registration request with respect to the image forming apparatus 100 or a user authentication request with respect to the image forming apparatus 100.

In more detail, the cloud 400 may receive, from the user terminal 200, the ID information of the image forming apparatus 100, the ID information of the user terminal 200, and the user information. The cloud 400 may play a role of a connector that connects the user terminal 200 to the authentication server 500. The cloud 400 may store user login information with respect to the image forming apparatus 100 based on the ID information of the image forming apparatus 100, the ID information of the user terminal 200, and the user information and may transmit the stored user login information to the authentication server 500 corresponding to the image forming apparatus 100. In the printing environment including the internal wireless network, not only when the user terminal 200 connected to the internal wireless network receives user authentication of the image forming apparatus 100 via the internal wireless network but also when the user terminal 200 not connected to the internal wireless network receives user authentication of the image forming apparatus 100, the printing system using the cloud 400 enables the user terminal 200 to connect to the authentication server 500 by using the cloud 400, thereby enabling user registration or user authentication of the image forming apparatus 100.

The authentication server 500 may register each of the image forming apparatuses 100 and 100-2 and manage ID information of the image forming apparatuses 100 and 100-2. The authentication server 500 may store user login information with respect to the image forming apparatuses 100 and 100-2 based on the ID information of the image forming apparatuses 100 and 100-2, the ID information of the user terminal 200, and the user information such that only authorized users may use the image forming apparatuses 100 and 100-2.

The authentication server 500 may compare the pre-stored user login information with respect to the image forming apparatus 100 with the user login information with respect to the image forming apparatus 100 received from the cloud 400 and may perform user registration or user authentication, based on a result of the comparison.

FIG. 4 is a block diagram of a cloud according to an example.

Referring to FIG. 4, the cloud 400 of may include a processor 410, a communication interface 420, and a storage 430. However, all of the illustrated components are not essential. The cloud 400 may be implemented by more or fewer components than those illustrated in FIG. 4. The aforementioned components will now be described.

The processor 410 may include a metadata parser 411, a ticket creator 412, a ticket manager 413, and a message creator 414.

The metadata parser 411 may receive, from the user terminal 200, the ID information of the image forming apparatus 100, the ID information of the user terminal 200, and the user information. The metadata parser 411 may determine whether to transmit a user registration request or a user authentication request with respect to the image forming apparatus 100 to the authentication server 500, based on whether the user terminal 200 has been registered in the authentication server 500.

For example, when a user is not registered as a user allowed to use the image forming apparatus 100 in the authentication server 500, the metadata parser 411 may conduct a process for transmitting a registration request of the user with respect to the image forming apparatus 100 to the authentication server 500. The metadata parser 411 may transmit the ID information of the user terminal 200 and the user information to the message creator 414 and may request the ticket creator 412 to create a ticket.

As another example, when the user is registered as a user allowed to use the image forming apparatus 100 in the authentication server 500, the metadata parser 411 may conduct a process for transmitting an authentication request of the user with respect to the image forming apparatus 100 to the authentication server 500. The metadata parser 411 may transmit the ID information of the user terminal 200 to the message creator 414.

When the ticket creator 412 is requested to create a ticket by the metadata parser 411, the ticket creator 412 may create a ticket and transmit an ID of the created ticket to the user terminal 200. The ticket creator 412 may inform the ticket manager 413 that a ticket has been created.

The ticket manager 413 may receive a current ticket state from the authentication server 500, update a ticket state, and delete a ticket ID after the lapse of a preset time period.

The message creator 414 may transmit the ID information of the user terminal 200 and the user information received from the metadata parser 411 to an authenticator of the authentication server 500 by using a Message Queuing Telemetry Transport (MQTT) library and may request the authenticator to register the user. The user information may include, but is not limited to, an ID, a PW, a name, an email of the user, or the like.

The message creator 414 may also transmit the ID information of the pre-registered user terminal 200 received from the metadata parser 411 to the authenticator of the authentication server 500 and may request the authenticator to authenticate the user.

The communication interface 420 may receive information from an external apparatus and/or transmit information to the external apparatus. The external apparatus may be, but is not limited to, the user terminal 200 or the authentication server 500.

For example, the communication interface 420 may be connected to the user terminal 200 or the authentication server 500 via a Wi-Fi or WFD wireless communication network. Examples of a wireless communication network via which the communication interface 420 can be connected to the external apparatus may include, but are not limited to, wireless LAN, Wi-Fi, Bluetooth, ZigBee, WFD, ultra wideband (UWB), infrared Data Association (IrDA), BLE, and NFC.

The storage 430 may store information received from the user terminal 200, information to be transmitted to the user terminal 200, information received from the authentication server 500, information to be transmitted to the authentication server 500, and information generated by the cloud 400.

The cloud 400 may further include a central processor to control overall operations of the processor 410, the communication interface 420, and the storage 430. The central processor may be implemented by an array of a plurality of logic gates, or by a combination of a general-use microprocessor and a memory in which a program executable by the general-use microprocessor is stored. It will also be understood by one of ordinary skill in the art to which this example pertains that the central processor may be implemented by other types of hardware.

FIG. 5 is a block diagram of an authentication server according to an example.

Referring to FIG. 5, the authentication server 500 may include a processor 510, a communication interface 520, and a storage 530. However, all of the illustrated components are not essential. The authentication server 500 may be implemented by more or fewer components than those illustrated in FIG. 5. The aforementioned components will now be described.

The processor 510 may include a device manager 511 and an authenticator 512.

The device manager 511 may search for at least one image forming apparatus 100 connected to the authentication server 500 and may obtain ID information of the at least one image forming apparatus 100. The ID information of the at least one image forming apparatus 100 may include at least one of a host name, a MAC address, an IP address, a model name, information of a toner of the at least one image forming apparatus 100, or the like. The device manager 511 may store the obtained ID information of the at least one image forming apparatus 100 in the storage 530.

The device manager 511 may also store, in the storage 530, user information of a user who is to use the image forming apparatus 100, wherein the user information is received from the message creator 414 of the cloud 400.

The device manager 511 may make a subscribing request to the message creator 414 of the cloud 400, based on the ID information of the image forming apparatus 100. The subscribing request may denote registration of an MQTT topic configured with ID information by using the MQTT library for each image forming apparatus 100, based on the ID information of the image forming apparatus 100. When the cloud 400 receives a user authentication request with respect to the image forming apparatus 100 from the user terminal 200, the cloud 400 may publish login information of the user by using a topic corresponding to the image forming apparatus 100. In this case, only the authentication server 500 that has registered the topic corresponding to the image forming apparatus 100 may receive the published login information of the user.

When the authenticator 512 is requested to perform user registration, the authenticator 512 may compare user information pre-registered in the authentication server 500 with the ID information of the user terminal 200 and the user information received from the message creator 414 of the cloud 400. When the pre-registered user information is identical with the user information received from the message creator 414, the authenticator 512 may map the ID information of the user terminal 200 to the pre-registered user information and store a result of the mapping. On the other hand, when the pre-registered user information is not identical with the user information received from the message creator 414, the authenticator 512 may map the ID information of the user terminal 200 to the user information received from the message creator 414 and store a result of the mapping.

When the authenticator 512 is requested to perform user authentication, the authenticator 512 may compare ID information of the user terminal 200 pre-registered in the authentication server 500 with the ID information of the user terminal 200 received from the message creator 414 to thereby perform the user authentication. When the user authentication succeeds, the authenticator 512 may transmit an authentication success message to the image forming apparatus 100. On the other hand, when the user authentication fails, the authenticator 512 may transmit an authentication fail message to the image forming apparatus 100.

The communication interface 520 may receive information from an external apparatus and/or transmit information to the external apparatus. The external apparatus may be, but is not limited to, the cloud 400 or the image forming apparatus 100.

The storage 530 may store information received from the cloud 400, information to be transmitted to the cloud 400, information received from the image forming apparatus 100, information to be transmitted to the image forming apparatus 100, information received from the user terminal 200, information to be transmitted to the user terminal 200, and information generated by the authentication server 500.

The authentication server 500 may further include a central processor to control overall operations of the processor 510, the communication interface 520, and the storage 530. The central processor may be implemented by an array of a plurality of logic gates, or by a combination of a general-use microprocessor and a memory in which a program executable by the general-use microprocessor is stored. It will also be understood by one of ordinary skill in the art to which this example pertains that the central processor may be implemented by other types of hardware.

Matters to be clearly understood and expected by one of ordinary skill in the art to which the disclosure pertains may be understood by typical implementations even when none of the cloud 400 and the authentication server 500 is specified, and the scope of the disclosure is not limited by the titles or physical/logical structures of specified components.

FIG. 6 is a diagram for explaining a process in which a cloud requests an authentication server to register a user who desires to use an image forming apparatus and the authentication server registers the user according to an example.

Referring to FIG. 6, the user terminal 200 may access a first image forming apparatus 100 to obtain ID information of the first image forming apparatus 100 in operation S601. For example, when the user terminal 200 reads an NFC tag of an image forming apparatus by using an NFC reader, the user terminal 200 may obtain ID information of the image forming apparatus recorded on the NFC tag. The ID information include at least one of a host name, a MAC address, an IP address, a model name, information of a toner of the image forming apparatus, or the like.

In operation S602, the cloud 400 may receive the ID information of the first image forming apparatus 100 and ID information of the user from the user terminal 200. In more detail, the cloud 400 may receive, from the user terminal 200, the ID information of the first image forming apparatus 100, the ID information of the user terminal 200, and the user information. The user information may include an ID, a PW, and an email of the user, and it will be understood by one of ordinary skill in the art to which this example pertains that the user information may include other information in addition to the aforementioned information. The cloud 400 may be connected to the user terminal 200 and a first authentication server 500 outside a network between the first image forming apparatus 100 and the first authentication server 500.

In operation S603, the cloud 400 may store login information of the user with respect to the first image forming apparatus 100, based on the ID information of the first image forming apparatus 100, the ID information of the user terminal 200, and the user information.

In operation S604, the cloud 400 may receive a registration request of the user with respect to the first image forming apparatus 100 from the user terminal 200.

When the user is not registered as a user for using the first image forming apparatus 100 in an authentication server, the user may install, in the user terminal 200, an application that supports printing by an image forming apparatus and execute the installed application. The user terminal 200 may transmit, to the cloud 400, the ID information of the first image forming apparatus 100, the ID information of the user terminal 200, and the user information, which are used during user authentication in the authentication server, to request the cloud 400 to register the user.

In operation S605, at the registration request of the user from the user terminal 200, the cloud 400 may transmit the registration request of the user to the first authentication server 500 corresponding to the first image forming apparatus 100, based on the login information of the user with respect to the first image forming apparatus 100.

In operation S606, at the registration request of the user, the first authentication server 500 may register the user as a user allowed to use the first image forming apparatus 100, based on the login information of the user. The first authentication server 500 may separately store the ID information of the user terminal 200 to thereby perform user authentication by using only the ID information of the user terminal 200.

In operation S607, the cloud 400 may receive a result of the user registration with respect to the first image forming apparatus 100 from the first authentication server 500. In operation S608, the cloud 400 may update a state of whether the user has been registered. In operation S609, the cloud 400 may transmit the result of the user registration to the user terminal 200.

FIG. 7 is a diagram for explaining a process in which a cloud requests an authentication server to authenticate a user who desires to use an image forming apparatus and the authentication server authenticates the user according to an example.

Referring to FIG. 7, operation S701 may correspond to operation S601 of FIG. 6, and operation S702 of FIG. 7 may correspond to operation S602 of FIG. 6. Thus, a description of FIG. 7 that is the same as or similar to that given above with reference to FIG. 6 will not be repeated hereinbelow.

In operation S703, the cloud 400 may receive an authentication request of a user with respect to the first image forming apparatus 100 from the user terminal 200. The user may be registered as a user allowed to use the first image forming apparatus 100 in the first authentication server 500, and the cloud 400 may receive a user authentication request with respect to the first image forming apparatus 100 from the user terminal 200.

The user may install, in the user terminal 200, an application that supports a printing process using an image forming apparatus, and execute the installed application. The user terminal 200 may transmit, to the cloud 400, the ID information of the first image forming apparatus 100, the ID information of the user terminal 200, and the user information, which are used during user authentication in the first authentication server 500, and request the cloud 400 to authenticate the user. Alternatively, the user terminal 200 may transmit only the ID information of the first image forming apparatus 100 and the ID information of the user terminal 200 to the cloud 400, and request the cloud 400 to authenticate the user.

In operation S704, the cloud 400 may transmit a user authentication request to the first authentication server 500, based on the login information of the user with respect to the first image forming apparatus 100, in response to the user authentication request from the user terminal 200.

In operation S705, at the user authentication request, the first authentication server 500 may execute user authentication, based on the login information of the user.

In operation S706, the first authentication server 500 may transmit a result of the user authentication with respect to the first image forming apparatus 100 to the first image forming apparatus 100. In operation S707, the first authentication server 500 may transmit the result of the user authentication with respect to the first image forming apparatus 100 to the cloud 400. In operation S709, the cloud 400 may transmit the user authentication result to the user terminal 200.

In operation S708, the first image forming apparatus 100 may receive the user authentication result from the first authentication server 500. The first image forming apparatus 100 may control a lock screen of the first image forming apparatus 100, based on the user authentication result. For example, when user authentication has been completed, the first image forming apparatus 100 may switch the lock screen of the first image forming apparatus 100 to an execution screen.

In the printing system using the cloud 400, the first image forming apparatus 100 does not store user information, and the first authentication server 500 corresponding to the first image forming apparatus 100 performs user registration and user authentication by using the user terminal 200 and the cloud 400, and thus information of a user is not exposed to the first image forming apparatus 100. Consequently, a risk of exposure of personal information of a user may be reduced or removed.

FIG. 8 is a diagram for explaining a process in which an authentication server registers an image forming apparatus and a cloud generates a topic of the authentication server by using ID information of the image forming apparatus according to an example.

Referring to FIG. 8, one or more authentication servers 500 and 500-2 may search for one or more image forming apparatuses 100, 100-2, 100-3, 100-4, 100-5, and 100-6 connected to the one or more authentication servers 500 and 500-2 in operation S801.

The first authentication server 500 may search for one or more image forming apparatuses 100, 100-2, and 100-3 connected to the first authentication server 500, and may receive ID information of the one or more image forming apparatuses 100, 100-2, and 100-3 from the one or more image forming apparatuses 100, 100-2, and 100-3. A second authentication server 500-2 may search for one or more image forming apparatuses 100-4, 100-5, and 100-6 connected to the second authentication server 500-2, and may receive ID information of the one or more image forming apparatuses 100-4, 100-5, and 100-6 from the one or more image forming apparatuses 100-4, 100-5, and 100-6. The ID information of the one or more image forming apparatuses 100, 100-2, 100-3, 100-4, 100-5, and 100-6 may include at least one of a host name, a MAC address, an IP address, a model name, and information of a toner of each of the one or more image forming apparatuses 100, 100-2, 100-3, 100-4, 100-5, and 100-6.

In operation S802, each of the one or more authentication servers 500 and 500-2 may register the one or more image forming apparatuses 100, 100-2, 100-3, 100-4, 100-5, and 100-6 as image forming apparatuses manageable by the one or more authentication servers 500 and 500-2, based on the ID information of the one or more image forming apparatuses 100, 100-2, 100-3, 100-4, 100-5, and 100-6.

The first authentication server 500 may generate a list of image forming apparatuses manageable by the first authentication server 500, based on the ID information of the one or more image forming apparatuses 100, 100-2, and 100-3, and may store the generated list. The second authentication server 500-2 may generate a list of image forming apparatuses manageable by the second authentication server 500-2, based on the ID information of the one or more image forming apparatuses 100-4, 100-5, and 100-6, and may store the generated list.

In operation S803, the one or more authentication servers 500 and 500-2 may transmit, to the cloud 400, information of the one or more authentication servers 500 and 500-2 and ID information of the one or more image forming apparatuses 100, 100-2, 100-3, 100-4, 100-5, and 100-6 managed by each of the one or more authentication servers 500 and 500-2.

In operation S804, the cloud 400 may generate a topic of the one or more authentication servers 500 and 500-2, based on the information of the one or more authentication servers 500 and 500-2 and the ID information of the one or more image forming apparatuses 100, 100-2, 100-3, 100-4, 100-5, and 100-6 received from the one or more authentication servers 500 and 500-2. The cloud 400 may register a topic of an MQTT protocol, based on ID information of an image forming apparatus, such as a MAC address, and thus, even when a plurality of authentication servers exist, the cloud 400 may control each of the authentication servers to receive only an event (for example, user registration or user authentication) for image forming apparatuses managed by each authentication server.

For example, even when a plurality of authentication servers 500 and 500-2 are connected to the cloud 400, each of the authentication servers 500 and 500-2 may receive, from the cloud 400, a user registration request or a user authentication request with respect to an image forming apparatus managed by each of the authentication servers 500 and 500-2.

FIG. 9 is a diagram for explaining a user registration or user authentication process of an image forming apparatus by using a cloud when a plurality of authentication servers exist in the printing system according to an example.

Referring to FIG. 9, the user terminal 200 may obtain ID information of the first image forming apparatus 100 from the first image forming apparatus 100 in operation S901.

In operation S902, the cloud 400 may receive, from the user terminal 200, the ID information of the first image forming apparatus 100, ID information of the user terminal 200, and user information. The cloud 400 may store login information of a user with respect to the first image forming apparatus 100, based on the ID information of the first image forming apparatus 100, the ID information of the user terminal 200, and the user information. The cloud 400 may also receive a registration or authentication request of the user with respect to the first image forming apparatus 100 from the user terminal 200.

In operation S903, the cloud 400 may transmit the registration or authentication request of the user to the first authentication server 500 corresponding to the first image forming apparatus 100, based on the login information of the user and a topic of an authentication server stored in the cloud 400. In more detail, the cloud 400 may transmit the registration or authentication request of the user to the first authentication server 500 that has registered a topic corresponding to the first image forming apparatus 100, by referring to the ID information of the first image forming apparatus 100 and the topic of the authentication server.

For example, when the ID information of the first image forming apparatus 100 received by the cloud 400 from the user terminal 200 is "00;15:99:c8:de:ed," the cloud 400 may generate a topic, such as "SecuThruAuthProxy/00;15:99:c8:de:ed," based on the ID information of the first image forming apparatus 100, and thus only the first authentication server 500 having registered the topic "SecuThruAuthProxy/00;15:99:c8:de:ed" may receive an event (for example, user registration or user authentication) for the first image forming apparatus 100 from the cloud 400, and the second authentication server 500-2 not having registered the topic "SecuThruAuthProxy/00;15:99:c8:de:ed" may not receive an event for the first image forming apparatus 100.

FIG. 10 is a flowchart of a printing method using a cloud according to an example.

Referring to FIG. 10, the cloud 400 may receive a registration request of a user with respect to the first image forming apparatus 100 from the user terminal 200 in operation S1010.

When the user has never used the first image forming apparatus 100, the user needs user registration with respect to the first image forming apparatus 100. When the user terminal 200 transmits a registration request of the user with respect to the first image forming apparatus 100 to the cloud 400, the cloud 400 may receive the registration request of the user with respect to the first image forming apparatus 100 from the user terminal 200.

The cloud 400 may also receive, from the user terminal 200, ID information of the first image forming apparatus 100, ID information of the user terminal 200, and user information of the user. The user terminal 200 may access the first image forming apparatus 100 to obtain the ID information of the first image forming apparatus 100. For example, the ID information of the first image forming apparatus 100 may be device information of the first image forming apparatus 100, such as a MAC address of the first image forming apparatus 100.

The cloud 400 may store login information of the user with respect to the first image forming apparatus 100, based on the ID information of the first image forming apparatus 100, the ID information of the user terminal 200, and the user information of the user.

In operation S1020, the cloud 400 may transmit a registration request of the user including the ID information of the first image forming apparatus 100 and ID information of the user to the first authentication server 500 corresponding to the first image forming apparatus 100.

The cloud 400 may transmit, to the first authentication server 500, a registration request of the user including the login information of the user with respect to the first image forming apparatus 100 based on the ID information of the first image forming apparatus 100, the ID information of the user terminal 200, and the user information of the user.

The cloud 400 may receive a result of the user registration with respect to the first image forming apparatus 100 from the first authentication server 500 and may update a state of whether the user has been registered. The cloud 400 may transmit the result of the user registration to the user terminal 200.

In operation S1030, the cloud 400 may receive an authentication request of the user with respect to the first image forming apparatus 100 from the user terminal 200. In more detail, the user may be registered as a user allowed to use the first image forming apparatus 100 in the first authentication server 500, and the cloud 400 may receive an authentication request of the user with respect to the first image forming apparatus 100 from the user terminal 200.

In operation S1040, the cloud 400 may transmit an authentication request of the user including the ID information of the first image forming apparatus 100 and the ID information of the user to the first authentication server 500.

In more detail, the cloud 400 may transmit, to the first authentication server 500, an authentication request of the user including the login information of the user with respect to the first image forming apparatus 100 based on the ID information of the first image forming apparatus 100, the ID information of the user terminal 200, and the user information of the user.

In operation S1050, the cloud 400 may receive a result of the user authentication from the first authentication server 500 and may transmit the result of the user authentication to the user terminal 200.

FIG. 11 is a flowchart of a printing method using a cloud in which, when a plurality of authentication servers exist, a cloud requests an authentication server corresponding to an image forming apparatus to register or authenticate a user with respect to the image forming apparatus according to an example.

Referring to FIG. 11, the cloud 400 may receive, from at least one authentication server, information of the at least one authentication server and ID information of at least one image forming apparatus that is managed by the at least one authentication server in operation S1110. The at least one authentication server may perform user authentication of the at least one image forming apparatus with respect to a user of the user terminal 200.

In operation S1120, the cloud 400 may store information of the at least one authentication server and information of at least one image forming apparatus that is managed by each of the at least one authentication server.

In operation S1130, the cloud 400 may determine the first authentication server 500 corresponding to the first image forming apparatus 100 from among the at least one authentication server, based on ID information of the first image forming apparatus 100 received from the user terminal 200 and the stored information of the at least one image forming apparatus.

In operation S1140, the cloud 400 may transmit a user registration or user authentication request to the first authentication server 500, based on a channel corresponding to the first image forming apparatus 100.

The printing system described above may be implemented as a hardware component, a software component, and/or a combination of hardware components and software components. For example, the apparatuses and components described in the examples may be implemented using at least one general-use computer or special-purpose computer, such as, a processor, a controller, an arithmetic logic unit (ALU), a digital signal processor, a microcomputer, a field programmable array (FPA), a programmable logic unit (PLU), a microprocessor, or any other device capable of executing and responding to instructions.

The printing system may execute an operating system (OS) and one or more software applications running on the OS. In addition, the processing device may access, store, manipulate, process, and generate data in response to execution of software.

For ease of understanding, a single processing apparatus may be described as being used, but one of ordinary skill in the art will recognize that the processing apparatus may include a plurality of processing elements and/or a plurality of types of processing elements. For example, the processing apparatus may include a plurality of processors or a single processor, and a controller. The printing system may have another processing configuration, such as a parallel processor.

The software may include a computer program, a code, instructions, or a combination of one or more of the foregoing, and may configure the printing system so that the printing system can operate as intended, or to independently or collectively give instructions to the printing system.

The software and/or the data may be permanently or temporarily embodied in any type of machine, component, physical device, virtual equipment, computer storage media or devices, or transmitted signal waves, such that the software and/or the data is interpreted by the printing system or provides an instruction or data to the printing system. The software may be distributed over a networked computer system and stored or executed in a distributed manner. The software and the data may be stored on one or more computer readable recording media.

A method according to an example may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for examples or may be well-known to and be usable by one of ordinary skill in the art of computer software.

Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory.

Examples of the program commands are advanced language codes that can be executed by a computer by using an interpreter or the like as well as machine language codes made by a compiler.

The hardware devices can be configured to function as one or more software modules so as to perform operations according to examples, or vice versa.

While the disclosure has been particularly shown and described with reference to examples thereof, it will be understood by those of ordinary skill in the art that various changes in form and details may be made therein without departing from the spirit and scope of the disclosure as defined by the following claims. For example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

The invention claimed is:

1. A cloud system comprising:
a processor; and
a non-transitory storage medium storing instructions executable on the processor to:
receive, from a user terminal, a registration request for a user with respect to an image forming apparatus,
transmit the registration request for the user including identification (ID) information of the image forming apparatus and ID information of the user to an authentication server corresponding to the image forming apparatus,
receive, from the user terminal, an authentication request for the user with respect to the image forming apparatus,
transmit, to the authentication server, the authentication request for the user including the ID information of the image forming apparatus and the ID information of the user,
receive, at the cloud system from the authentication server, information of the authentication server and the ID information of the image forming apparatus that is managed by the authentication server; and
store, at the cloud system, the information of the authentication server and information of the image forming apparatus that is managed by the authentication server.

2. The cloud system of claim 1, wherein the instructions are executable on the processor to:
receive, from the user terminal, the ID information of the image forming apparatus obtained by the user terminal, ID information of the user terminal, and user information of the user, and
store login information of the user with respect to the image forming apparatus, based on the ID information of the image forming apparatus, the ID information of the user terminal, and the user information of the user.

3. The cloud system of claim 2, wherein the instructions are executable on the processor to transmit the registration request for the user to the authentication server, based on the login information of the user with respect to the image forming apparatus, in response to the registration request for the user received from the user terminal.

4. The cloud system of claim 2, wherein the transmitting of the authentication request from the cloud system to the authentication server is responsive to the user being registered with respect to the image forming apparatus in the authentication server and the cloud system receiving the authentication request for the user with respect to the image forming apparatus from the user terminal.

5. The cloud system of claim 1, wherein the instructions are executable on the processor to:
receive a result of registering the user with respect to the image forming apparatus from the authentication server,
update a state of whether the user has been registered, and
transmit the result of the registering to the user terminal.

6. The cloud system of claim 1, wherein the instructions are executable on the processor to determine the authentication server corresponding to the image forming apparatus from among a plurality of authentication servers, based on the ID information of the image forming apparatus received from the user terminal and the stored information of the image forming apparatus.

7. The cloud system of claim 6, wherein the instructions are executable on the processor to transmit the registration request for the user or the authentication request for the user to the authentication server, based on a channel corresponding to the image forming apparatus.

8. The cloud system of claim 1, wherein the cloud system is connected to the authentication server, outside a firewall of a network between the image forming apparatus and the authentication server.

9. The cloud system of claim 1, wherein the instructions are executable on the processor to:
receive a result of authentication of the user from the authentication server, and
transmit the result of the authentication of the user to the user terminal.

10. A printing method using a cloud, the printing method comprising:
receiving, by the cloud from a user terminal, a registration request for a user with respect to an image forming apparatus;
transmitting, by the cloud to an authentication server corresponding to the image forming apparatus, the registration request for the user including identification (ID) information of the image forming apparatus and ID information of the user;
receiving, by the cloud from the user terminal, an authentication request for the user with respect to the image forming apparatus;
transmitting, by the cloud to the authentication server, the authentication request for the user including the ID information of the image forming apparatus and the ID information of the user;
receiving, by the cloud, a result of authentication of the user from the authentication server, and transmitting, by the cloud, the result of the authentication of the user to the user terminal;
receiving, by the cloud from the authentication server, information of the authentication server and the ID information of the image forming apparatus that is managed by the authentication server; and
storing, by the cloud, the information of the authentication server and information of the image forming apparatus that is managed by the authentication server.

11. The printing method of claim 10, further comprising:
receiving, by the cloud from the user terminal, the ID information of the image forming apparatus obtained by the user terminal, ID information of the user terminal, and user information of the user; and
storing, by the cloud, login information of the user with respect to the image forming apparatus, based on the ID information of the image forming apparatus, the ID information of the user terminal, and the user information of the user.

12. The printing method of claim 11, wherein the transmitting of the registration request for the user comprises transmitting the registration request for the user to the authentication server, based on the login information of the user with respect to the image forming apparatus, in response to the registration request for the user received from the user terminal.

13. The printing method of claim 11, wherein the transmitting of the authentication request by the cloud to the authentication server is responsive to the user being registered with respect to the image forming apparatus in the authentication server and the cloud receiving the authentication request for the user with respect to the image forming apparatus from the user terminal.

14. The printing method of claim 10, further comprising:
receiving, by the cloud, a result of registration of the user with respect to the image forming apparatus from the authentication server;
updating, by the cloud, a state of whether the user has been registered; and
transmitting, by the cloud, the result of the registration to the user terminal.

15. The printing method of claim 10, further comprising determining the authentication server corresponding to the image forming apparatus from among a plurality of authentication servers, based on the ID information of the image forming apparatus received from the user terminal and the stored information of the image forming apparatus.

16. The printing method of claim 15, wherein the transmitting, by the cloud, of the registration request for the user or the authentication request for the user to the authentication server is based on a channel corresponding to the image forming apparatus.

17. The printing method of claim 10, wherein the cloud is connected to the authentication server, outside a firewall of a network between the image forming apparatus and the authentication server.

18. A non-transitory computer-readable storage medium comprising instructions that upon execution cause a cloud to:
receive, at the cloud from a user terminal, a registration request for a user with respect to an image forming apparatus;
transmit, from the cloud to an authentication server corresponding to the image forming apparatus, the registration request for the user including identification (ID) information of the image forming apparatus and ID information of the user;
receive, at the cloud from the user terminal, an authentication request for the user with respect to the image forming apparatus;
transmit, from the cloud to the authentication server, the authentication request for the user including the ID information of the image forming apparatus and the ID information of the user;
receive, at the cloud, a result of authentication of the user from the authentication server, and transmit, by the cloud, the result of the authentication of the user to the user terminal;
receive, at the cloud from the authentication server, information of the authentication server and the ID information of the image forming apparatus that is managed by the authentication server; and
store, at the cloud, the information of the authentication server and information of the image forming apparatus that is managed by the authentication server.

19. The non-transitory computer-readable storage medium of claim 18, wherein the instructions upon execution cause the cloud to:
receive a result of registering the user with respect to the image forming apparatus from the authentication server,
update a state of whether the user has been registered, and
transmit the result of the registration to the user terminal.

* * * * *